US012307927B2

(12) United States Patent
Wang

(10) Patent No.: US 12,307,927 B2
(45) Date of Patent: *May 20, 2025

(54) SUPPORTING PLATE AND DISPLAY MODULE

(71) Applicant: Wuhan China Star Optoelectronics Semiconductor Display Technology Co., Ltd., Hubei (CN)

(72) Inventor: Wenqiang Wang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,507

(22) Filed: Feb. 27, 2024

(65) Prior Publication Data

US 2024/0194097 A1 Jun. 13, 2024

Related U.S. Application Data

(63) Continuation of application No. 17/262,756, filed as application No. PCT/CN2020/120088 on Oct. 10, 2020, now Pat. No. 11,955,036.

(30) Foreign Application Priority Data

Aug. 20, 2020 (CN) ........................ 202010843706.X

(51) Int. Cl.

*G06F 1/16* (2006.01)
*G09F 9/30* (2006.01)
*G09F 9/33* (2006.01)

(52) U.S. Cl.

CPC .............. *G09F 9/301* (2013.01); *G09F 9/335* (2021.05)

(58) Field of Classification Search

CPC ......... G09F 9/301; G09F 9/335; G06F 1/1652
See application file for complete search history.

(56) References Cited

U.S. PATENT DOCUMENTS

| | | | | |
|---|---|---|---|---|
| 10,573,852 B2 | 2/2020 | Kim et al. | | |
| 2019/0269011 A1* | 8/2019 | Lee | ...................... | H05K 3/0014 |
| 2020/0192431 A1* | 6/2020 | Shin | ...................... | G06F 1/1626 |

FOREIGN PATENT DOCUMENTS

| | | |
|---|---|---|
| CN | 208141720 U | 11/2018 |
| CN | 110649087 A | 1/2020 |

(Continued)

OTHER PUBLICATIONS

Chinese Office Action issued in corresponding Chinese Patent Application No. 202010843706.X dated Mar. 31, 2021, pp. 1-9.

(Continued)

*Primary Examiner* — Anthony Q Edwards
(74) *Attorney, Agent, or Firm* — Nathan & Associates; Menachem Nathan

(57) ABSTRACT

A supporting plate and a display module are provided. In the supporting plate, a bending part is connected between a first supporting main body and a second supporting main body. The bending part includes a first bending part. An end of the first bending part is connected to the first supporting main body, and another end of the first bending part is connected to the second supporting main body. Along a direction from the first supporting main body to the second supporting main body, the first bending part has a plurality of bending structures that bend back and forth in two opposite directions.

20 Claims, 6 Drawing Sheets

(56) References Cited

FOREIGN PATENT DOCUMENTS

| | | | |
|---|---|---|---|
| CN | 110706602 | A | 1/2020 |
| CN | 110767098 | A | 2/2020 |
| CN | 110992828 | A | 4/2020 |
| CN | 111477107 | A | 7/2020 |

OTHER PUBLICATIONS

Chinese Office Action issued in corresponding Chinese Patent Application No. 202010843706.X dated Sep. 13, 2021, pp. 1-7.

Chinese Rejection Decision issued in corresponding Chinese Patent Application No. 202010843706.X dated Jan. 19, 2022, pp. 1-7.

International Search Report in International application No. PCT/CN2020/120088, mailed on May 20, 2021.

Written Opinion of the International Search Authority in International application No. PCT/CN2020/120088, mailed on May 19, 2021.

* cited by examiner

SUPPORTING PLATE AND DISPLAY MODULE

CROSS-REFERENCE TO RELATED APPLICATIONS

This application is a continuation application of U.S. application Ser. No. 17/262,756, filed on Jan. 25, 2021, which is a National Phase of PCT Patent Application No. PCT/CN2020/120088 having international filling date of Oct. 10, 2020, which claims the priority of Chinese Application No. 202010843706.X filed with the Chinese Patent Office on Aug. 20, 2020 and titled "SUPPORT SHEET AND DISPLAY MODULE", which is incorporated herein by reference in its entirety.

BACKGROUND

Field

The present disclosure relates to the field of display technologies, and more particularly, to a supporting plate and a display module.

Background

Typically, flexible organic light-emitting diode (OLED) screen modules consists mainly of a protective layer, an adhesive layer, an OLED layer, a touch control layer, a polarizer, and a supporting plate.

The lowest layer of the modules is made of steel special use stainless (SUS) which is configured to support and protect the modules. Because an elastic modulus of the SUS is much greater than a modulus of an optically clear adhesive (OCA), which is a commonly viscoelastic material and is generally adjacent to the SUS. Viscoplastic deformation is prone to occur on the OCA when the OCA is bent. Due to different mechanical properties and endured forces between the SUS and the OCA, elastic deformation properties and good deformation consistency cannot be achieved during a bending process. As a result, protrusions may occur at points where the SUS and the OCA are connected. In addition, after a module is bent multiple times, applied forces may accumulate in those points, leading to failure issues of stripping and separation.

SUMMARY

An embodiment of the present disclosure provides a supporting plate and a display module to solve a following technical problem: After a module is bent multiple times, applied forces may accumulate in points where the SUS and the OCA are connected, leading to failure issues of stripping and separation.

An embodiment of the present disclosure provides a supporting plate, including a first supporting main body, a second supporting main body, and a bending part, wherein the bending part is connected between the first supporting main body and the second supporting main body;

the bending part includes at least one bending unit including a first bending part, an end of the first bending part is connected to the first supporting main body, and another end of the first bending part is connected to the second supporting part; and along a direction from the first supporting main body to the second supporting main body, the first bending part includes a plurality of bending structures that bend back and forth in two opposite directions.

In the supporting plate of an embodiment of the present disclosure, the first bending part includes:

- a plurality of first sub-sections spaced apart from each other and disposed side by side;
- at least one first direction-changing part connected to same sides of a $k^{th}$ first sub-section and a $(k+1)^{th}$ first sub-section; and
- at least one second direction-changing part, wherein a bending direction of the at least one second direction-changing part and a bending direction of the at least one first direction-bending part are opposite, the at least one second direction-changing part is connected to same sides of the $(k+1)^{th}$ first sub-section and a $(k+2)^{th}$ first sub-section, and k is an even number or an odd number.

In the supporting plate of an embodiment of the present disclosure, the at least one first direction-changing part includes an arc shape or a polyline shape formed from two line sections.

In the supporting plate of an embodiment of the present disclosure, the bending unit further includes a second bending part, an end of the second bending part is connected to the first supporting main body, and another end of the second bending part is connected to the second supporting main body;

- along the direction from the first supporting main body to the second supporting main body, the second bending part includes a plurality of bending structures that bend back and forth in two opposite directions; and
- the second bending part and the first bending part include a plurality of first connecting parts spaced apart from each other, an extending track of the first bending part and an extending track of the second bending part are separated from each other and are reconnected to each other at each of the first connecting parts.

In the supporting plate of an embodiment of the present disclosure, the second bending part includes:

- a plurality of second sub-sections spaced apart from each other and disposed side by side;
- at least one third direction-changing part, wherein a bending direction of the at least one third direction-changing part and a bending direction of the at least one first direction-bending part are opposite, the at least one third direction-changing part is connected to same sides of a $k^{th}$ second sub-section and a $(k+1)^{th}$ second sub-section; and
- at least one fourth direction-changing part, wherein a bending direction of the at least one fourth direction-changing part and a bending direction of the at least one third direction-bending part are opposite, the at least one fourth direction-changing part is connected same sides of the $(k+1)^{th}$ second sub-section and a $(k+2)^{th}$ second sub-section;
- wherein the at least one third direction-changing part and the at least one first direction-changing part are connected to each other to form the first connecting part.

In the supporting plate of an embodiment of the present disclosure, the at least one first direction-changing part is connected to the at least one third direction-changing part by an arc.

In the supporting plate of an embodiment of the present disclosure, a distance between two adjacent first sub-sections and a distance between two adjacent second sub-sections are equal.

In the supporting plate of an embodiment of the present disclosure, the at least one first direction-changing part and the at least one third direction-changing part are semicircular arcs, a width of the first connecting part is X, widths of the first sub-sections and the second sub-sections are Y, a width of a hole formed from the at least one first bending part and the at least one second bending part is D, and a length of the hole formed from the at least one first bending part and the at least one second bending part is L; and wherein 100 μm≤X≤220 μm, Y≤120 μm, D≤200 μm, and L≤3.2 mm.

In the supporting plate of an embodiment of the present disclosure, the plurality of bending units are sequentially connected to each other side by side along a direction perpendicular to the direction from the first supporting main body to the second supporting main body;

In the supporting plate of an embodiment of the present disclosure, between two adjacent bending units, the at least one fourth direction-changing part and the at least one second direction-changing part are connected to each other to form the second connecting part.

The present disclosure further relates to a display module, including an OLED panel, an adhesive layer, and the above-mentioned supporting plate, which are sequentially disposed.

the OLED panel includes a bending area and a non-bending area disposed at two sides of the bending area, the first supporting main body and the second supporting main body are respectively and correspondingly disposed in the non-bending area, and the bending part is correspondingly disposed in the bending area;

Specifically, the supporting plate includes a first supporting main body, a second supporting main body, and a bending part, the bending part is connected between the first supporting main body and the second supporting main body.

The bending part includes at least one bending unit including a first bending part, an end of the first bending part is connected to the first supporting main body, and another end of the first bending part is connected to the second supporting part; and Along a direction from the first supporting main body to the second supporting main body, the first bending part includes a plurality of bending structures that bend back and forth in two opposite directions.

In the display module of an embodiment of the present disclosure, the first bending part includes:

- a plurality of first sub-sections spaced apart from each other and disposed side by side;
- at least one first direction-changing part connected to same sides of a $k^{th}$ first sub-section and a $(k+1)^{th}$ first sub-section; and
- at least one second direction-changing part, wherein a bending direction of the at least one second direction-changing part and a bending direction of the at least one first direction-bending part are opposite, the at least one second direction-changing part is connected to same sides of the $(k+1)^{th}$ first sub-section and a $(k+2)^{th}$ first sub-section, and k is an even number or an odd number.

In the display module of an embodiment of the present disclosure, the at least one first direction-changing part includes an arc shape or a polyline shape formed by two line sections.

In the display module of an embodiment of the present disclosure, the bending unit further includes a second bending part, an end of the second bending part is connected to the first supporting main body, and another end of the second bending part is connected to the second supporting main body;

along the direction from the first supporting main body to the second supporting main body, the second bending part includes a plurality of bending structures that bend back and forth in two opposite directions; and the second bending part and the first bending part include a plurality of first connecting parts spaced apart from each other, an extending track of the first bending part and an extending track of the second bending part are separated from each other and are reconnected to each other at each of the first connecting parts.

In the display module of an embodiment of the present disclosure, the second bending part includes:

- a plurality of second sub-sections spaced apart from each other and disposed side by side;
- at least one third direction-changing part, wherein a bending direction of the at least one third direction-changing part and a bending direction of the at least one first direction-bending part are opposite, the at least one third direction-changing part is connected to same sides of a $k^{th}$ second sub-section and a $(k+1)^{th}$ second sub-section; and
- at least one fourth direction-changing part, wherein a bending direction of the at least one fourth direction-changing part and a bending direction of the at least one third direction-bending part are opposite, the at least one fourth direction-changing part is connected same sides of the $(k+1)^{th}$ second sub-section and a $(k+2)^{th}$ second sub-section;
- wherein the at least one third direction-changing part and the at least one first direction-changing part are connected to each other to form the first connecting part.

In the display module of an embodiment of the present disclosure, the at least one first direction-changing part is connected to the at least one third direction-changing part by an arc.

In the display module of an embodiment of the present disclosure, a distance between two adjacent first sub-sections and a distance between two adjacent second sub-sections are equal.

In the display module of an embodiment of the present disclosure, the at least one first direction-changing part and the at least one third direction-changing part are semicircular arcs, a width of the first connecting part is X, widths of the first sub-sections and the second sub-sections are Y, a width of a hole formed from the at least one first bending part and the at least one second bending part is D, and a length of the hole formed from the at least one first bending part and the at least one second bending part is L; and wherein 100 μm≤X≤220 μm, Y≤120 μm, D≤200 μm, and L≤3.2 mm.

In the display module of an embodiment of the present disclosure, the plurality of bending units are sequentially connected to each other side by side along a direction perpendicular to the direction from the first supporting main body to the second supporting main body;

In the supporting plate of an embodiment of the present disclosure, between two adjacent bending units, the at least one fourth direction-changing part and the at least one second direction-changing part are connected to each other to form the second connecting part.

In the supporting plate and the display module of the present disclosure, by making a first bending part in the bending area of the supporting plate have multiple bending structures that bend back and forth in two opposite directions, deformation may accumulate in the first bending part. Therefore, a deformation difference between a SUS and an OCA may be compensated, applied forces may be prevented from accumulating in a certain area. As a result, risks of failure during a bending process of the display module are effectively reduced.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

Figure 1:
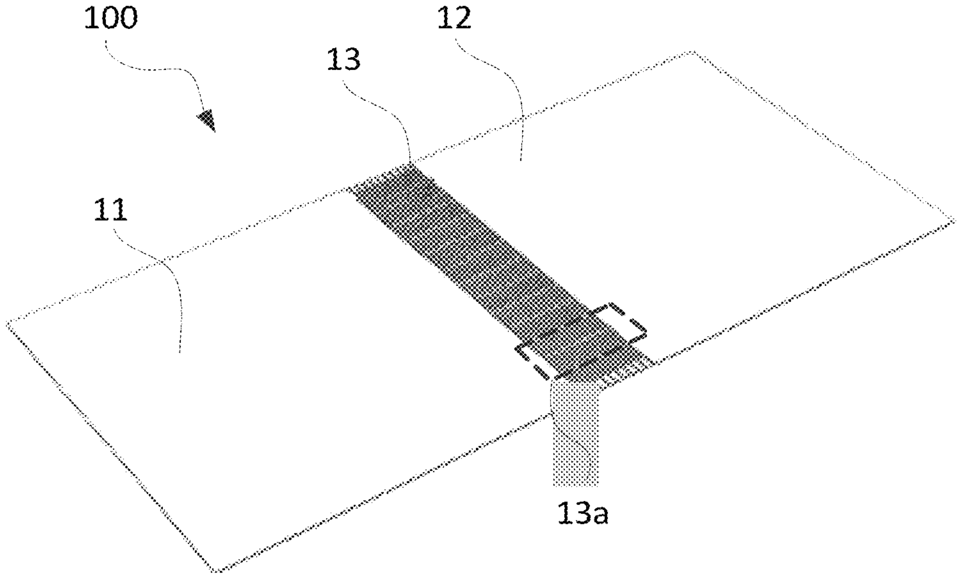
FIG. 1 is a structural schematic view showing a supporting plate according to an embodiment of the present disclosure.

Hereinafter a preferred embodiment of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

In the description of the present disclosure, it should be understood that terms such as “center”, “longitudinal”, “lateral”, “length”, “width”, “thickness”, “upper”, “lower”, “front”, “rear”, “left”, “right”, “vertical”, “horizontal”, “top”, “bottom”, “inside”, “outside”, “clockwise”, “counter-clockwise”, as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as “first” and “second” are used herein for purposes of description and are not intended to indicate or imply relative importance or significance. Thus, features limited by “first” and “second” are intended to indicate or imply including one or more than one these features. In the description of the present disclosure, “a plurality of” relates to two or more than two, unless otherwise specified.

In the description of the present disclosure, it should be noted that unless there are express rules and limitations, the terms such as “mount,” “connect,” and “bond” should be comprehended in broad sense. For example, it can mean a permanent connection, a detachable connection, or an integrate connection; it can mean a mechanical connection, an electrical connection, or can communicate with each other; it can mean a direct connection, an indirect connection by an intermediate, or an inner communication or an interaction between two elements. A person skilled in the art should understand the specific meanings in the present disclosure according to specific situations.

In the description of the present disclosure, unless specified or limited otherwise, it should be noted that, a structure in which a first feature is “on” or “beneath” a second feature may include an embodiment in which the first feature directly contacts the second feature and may also include an embodiment in which an additional feature is formed between the first feature and the second feature so that the first feature does not directly contact the second feature. Furthermore, a first feature “on,” “above,” or “on top of” a second feature may include an embodiment in which the first feature is right “on,” “above,” or “on top of” the second feature and may also include an embodiment in which the first feature is not right “on,” “above,” or “on top of” the second feature, or just means that the first feature has a sea level elevation greater than the sea level elevation of the second feature. While first feature “beneath,” “below,” or “on bottom of” a second feature may include an embodiment in which the first feature is right “beneath,” “below,” or “on bottom of” the second feature and may also include an embodiment in which the first feature is not right “beneath,” “below,” or “on bottom of” the second feature, or just means that the first feature has a sea level elevation less than the sea level elevation of the second feature.

Illustration below provides many different embodiments or examples to demonstrate different structures of the present disclosure. In order to simplify the disclosure of the present disclosure, components and settings of specific examples are described below. Of course, they are only examples and are not intended to limit the present disclosure. Furthermore, reference numbers and/or letters may be repeated in different examples of the present disclosure. Such repetitions are for simplification and clearness, which per se do not indicate the relations of the discussed embodiments and/or settings. Moreover, the present disclosure provides examples of various specific processes and materials, but the applicability of other processes and/or application of other materials may be appreciated by a person skilled in the art.

Figure 2:
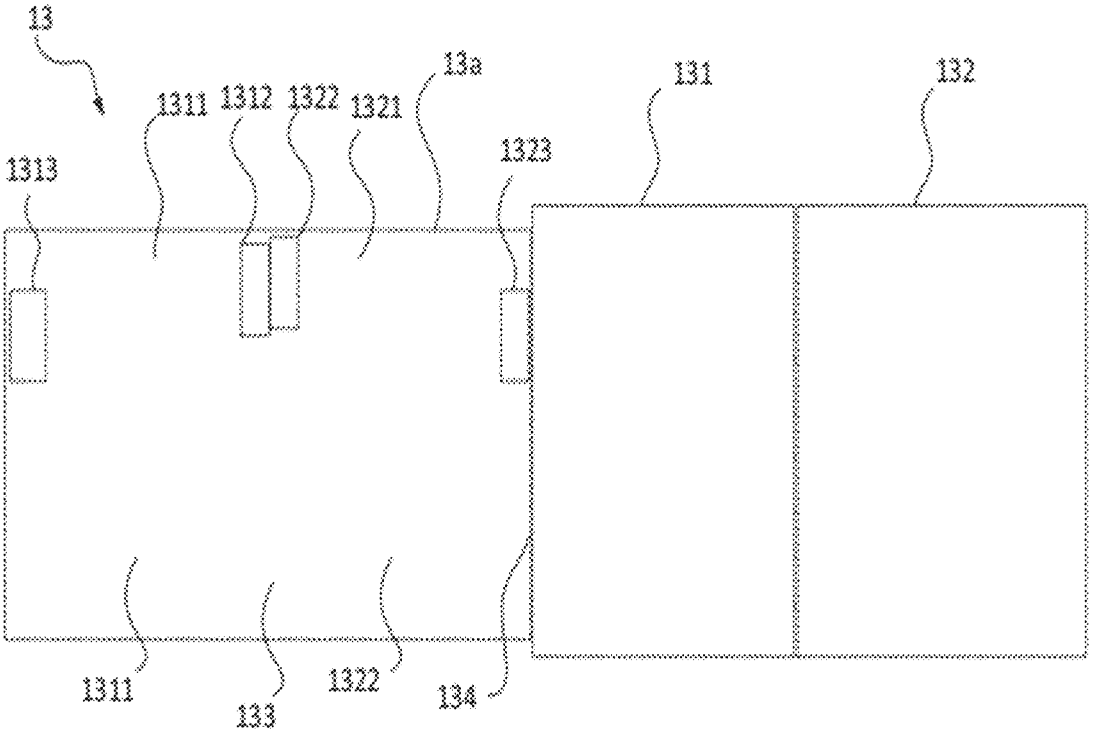
FIG. 2 is a partial structural view showing a bending part of the supporting plate according to the embodiment of the present disclosure.
Figure 3:
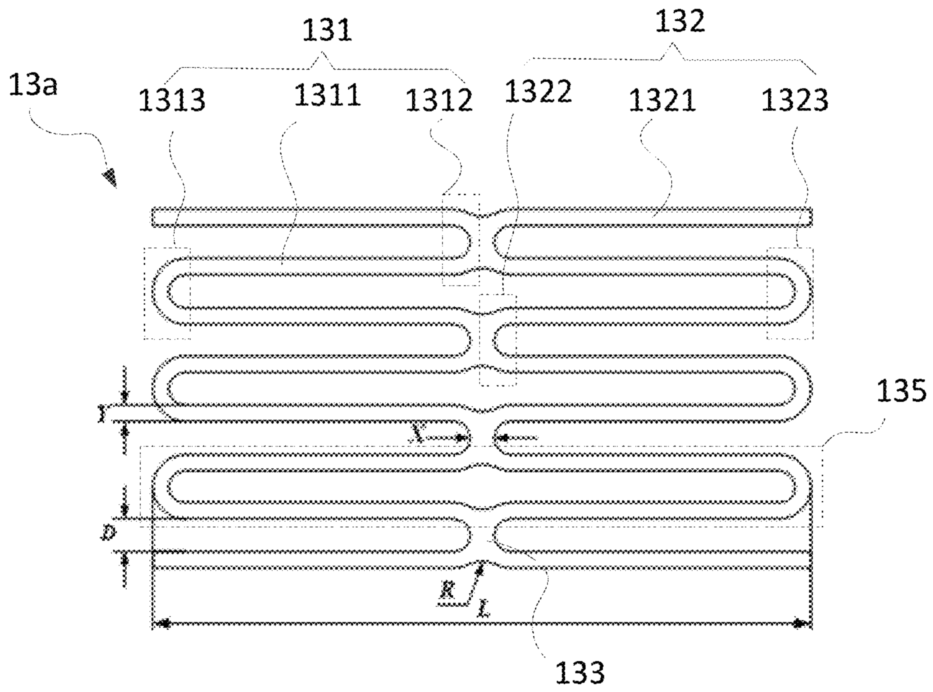
FIG. 3 is a structural schematic view showing a bending unit of the bending plate according to the embodiment of the present disclosure.
Figure 4:
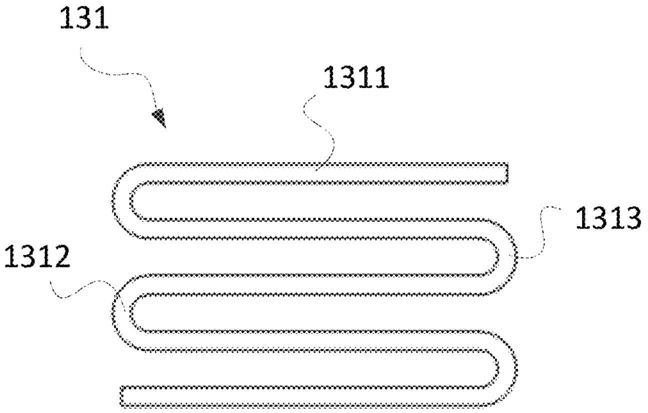
FIG. 4 is a structural schematic view showing an unfolded first bending part of the bending plate according to the embodiment of the present disclosure.

Please refer to FIGS. 1 to 4. FIG. 1 is a structural schematic view showing a supporting plate according to an embodiment of the present disclosure, FIG. 2 is a partial structural view showing a bending part of the supporting plate according to the embodiment of the present disclosure, FIG. 3 is a structural schematic view showing a bending unit of the bending plate according to the embodiment of the present disclosure, and FIG. 4 is a structural schematic view showing a unfolded first bending part of the bending plate according to the embodiment of the present disclosure.

An embodiment of the present disclosure provides a supporting plate 100, including a first supporting main body 11, a second supporting main body 12, and a bending part 13. The bending part 13 is connected between the first supporting main body 11 and the second supporting main body 12.

The bending part 13 includes at least one bending unit 13*a*. The bending unit 13*a* includes a first bending part 131. An end of the first bending part 131 is connected to the first supporting main body 11, and another end of the first bending part 131 is connected to the second supporting main body 12.

Along a direction from the first supporting main body 11 to the second supporting main body 12, the first bending part 131 includes a plurality of bending structures that bend back and forth in two opposite directions.

In the supporting plate 100 of the present embodiment, by making the first bending part 131 of the bending part 13 have multiple bending structures that bend back and forth in two opposite directions, deformations may accumulate in the first bending part 131. Therefore, a deformation difference between a SUS and an OCA may be compensated, and applied forces may be prevented from accumulating in a certain area. As a result, risks of failure during a bending process of the display module are effectively reduced.

Figure 5:
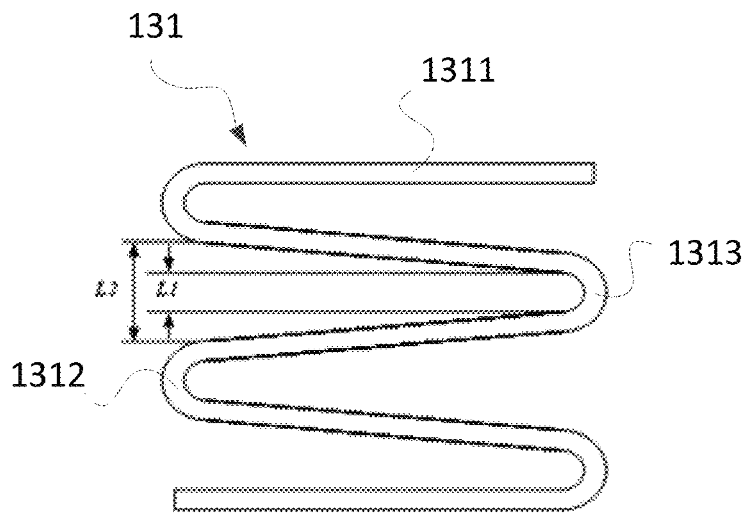
FIG. 5 is a structural schematic view showing a folded first bending part of the bending plate according to the embodiment of the present disclosure.

For example, as shown in FIG. 4 and FIG. 5, the first bending part 131 has an n number of s-shaped sub-structures. When each of the sub-structures is stretched, a deformation amount is $L0=L2-L1$, and an accumulated deformation amount is $n*L0$, wherein n is a positive integer. That is, by accumulating deformation to improve flexibility of the bending part, bendability of the supporting plate 100 is improved.

Please refer to FIG. 3. The bending unit 13*a* further includes a second bending part 132. An end of the second bending part 132 is connected to the first supporting main body 11, and another end of the second bending part 132 is connected to the second supporting main body 12.

Along the direction from the first supporting main body 11 to the second supporting main body 12, the second bending part 12 includes a plurality of bending structures that bend back and forth in two opposite directions.

The second bending part 132 and the first bending part 131 include a plurality of first connecting parts 133. The first connecting parts 133 are spaced apart from each other. In the present embodiment, the first connecting parts 133 are disposed side by side.

An extending track of the first bending part 131 and an extending track of the second bending part 132 are separated from each other and are reconnected at each of the first connecting parts 133.

In the present embodiment, the first bending part 131 and the second bending part are separated from each other at one first connecting part 133, and are reconnected to each other at another first connecting part 133 next to the former one. By repeating this arrangement, a patterned double s-shaped structure is formed. Not only can bendability of the bending part 13 be enhanced, malleability and stability of the bending part 13 can also be improved.

In the supporting plate 100 of the present embodiment, a plurality of bending units 13*a* are sequentially connected to each other side by side along a direction perpendicular to the direction from the first supporting main body 11 to the second supporting main body 12.

Two adjacent bending units 13*a* are connected to each other to form a plurality of second connecting parts 134.

Between two adjacent bending units 13*a*, the extending track of the second bending part 132 of one bending unit 13*a* and the extending track of the first bending part 131 of the other bending unit 13*a* are separated from each other and are reconnected to each other at each of the second connecting parts 134.

In the present embodiment, two adjacent bending units 13*a* are also connected to each other. As a result, the entire bending part 13 is a whole, and the bending part 13 is stable. The entire bending part 13 may be integrally formed, or may be formed by mechanical connection.

In the bending part 13 of the present embodiment, the first connecting part 131 and the second connecting part 132 are alternately disposed and sequentially connected to each other, thereby forming the bending part 13. Furthermore, the first bending part 131 and the second bending part 132 include a plurality of bending structures that bend back and forth in two opposite directions, forming a patterned structure of the bending part 13. In addition, a plurality of holes 135 are defined between the first bending part 131 and the second bending part 132, thereby further releasing applied forces endured by the bending part 13.

By accumulating deformation amount to reduce applied forces accumulated at a certain area, risks of failure are effectively reduced when the first bending part 131 and the second bending part 132 of the bending part 13 of the display module is bent. By defining the holes 135 between the first bending part 131 and the second bending part 132, applied forces in the first bending part 131 may be released. Furthermore, by connecting the first bending part 131 to the second bending part 132, stability of the entire bending part 13 is improved.

Specifically, in the supporting plate 100 of the present embodiment, the first bending part 131 includes a plurality of first sub-sections 1311, at least one first direction-changing part 1312, and at least one second direction-changing part 1313.

The first sub-sections 1311 are spaced apart from each other and disposed side by side. The first direction-changing part 1312 is connected to a same side of a $k^{th}$ first sub-section and a $(k+1)^{th}$ first sub-section.

A bending direction of the second direction-changing part 1313 and a bending direction of the first direction-changing part 1312 are opposite. The section direction-changing part 1313 is connected to another same side of the $(k+1)^{th}$ first sub-section and a $(k+2)^{th}$ first sub-section; k is an odd number or an even number.

It should be noted that k is an odd number or an even number. Specifically, k includes at least two odd numbers starting from 1, e.g., (1, 3) or (1, 3, 5), etc. Alternatively, k may also include at least two even numbers starting from 0 or 2, e.g., (0, 2) or (2, 4), etc.

Specifically, as shown in FIG. 3, the plurality of first direction-changing parts 1312 are respectively and correspondingly connected between a 1th first sub-section 1311 and a 2nd first sub-section 1311, a 3rd first sub-section 1311 and a 4th first sub-section 1311, a 5th first sub-section 1311 and a 6th first sub-section 1311, and a 7th first sub-section 1311 and a 8th first sub-section 1311.

The plurality of second direction-changing parts 1313 are respectively and correspondingly connected to the 2nd first sub-section 1311 and the 3rd first sub-section 1311, the 4th first sub-section 1311 and the 5th first sub-section 1311, and the 6th first sub-section 1311 and the 7th first sub-section 1311.

Optionally, each of the first direction-changing parts 1312 has an arc shape or a polyline shape formed from two line sections. The first sub-sections 1311 and a plurality of second sub-sections 1321 may be horizontal sections, inclined sections, or curved sections.

In the supporting plate 100 of the present embodiment, the second bending part 132 includes the plurality of second sub-sections 1321, at least one third direction-changing part 1322, and at least one fourth direction-changing part 1323.

The second sub-sections 1321 are spaced apart from each other and disposed side by side.

A bending direction of the third direction-changing part 1322 and the bending direction of the first direction-changing part 1312 are opposite. The third direction-changing part 1322 is connected to a same side of a $k^{th}$ second sub-section and a $(k+1)^{th}$ second sub-section.

A bending direction of the fourth direction-changing part 1323 and the bending direction of the third direction-changing part 1322 are opposite. The fourth direction-changing part 1323 is connected to a same side of the $(k+1)^{th}$ second sub-section and a $(k+2)^{th}$ second sub-section.

The third direction-changing part 1322 and the first direction-changing part 1312 are connected to each other to form one of the first connecting parts 133.

As shown in FIG. 3, the plurality of third direction-changing parts 1322 are respectively and correspondingly connected between a $1^{th}$ second sub-section 1321 and a $2^{nd}$ second sub-section 1321, a $3^{rd}$ second sub-section 1321 and a $4^{th}$ second sub-section 1321, a $5^{th}$ second sub-section 1321 and a $6^{th}$ second sub-section 1321, and a $7^{th}$ second sub-section 1321 and a $8^{th}$ second sub-section 1321.

The plurality of fourth direction-changing parts 1323 are respectively and correspondingly connected between the $2^{nd}$ second sub-section 1321 and the $3^{rd}$ second sub-section 1321, the $4_{th}$ second sub-section 1311 and the $5^{th}$ second sub-section 1321, and the $6^{th}$ second sub-section 1321 and the $7^{th}$ second sub-section 1321.

Between two adjacent bending units 13*a*, the fourth direction-changing part 1323 and the second direction-changing part 1313 are connected to each other to form a second connecting part 134.

The first direction-changing part 1312 and the third direction-changing part 1322 are connected to each other back to back at one of the first connecting parts 133. The second direction-changing part 1313 and the fourth direction-changing part 1323 are connected to each other back to back at one of the second connecting parts 134.

In the present embodiment, optionally, the first direction-changing part 1312, the second direction-changing part 1313, the third direction-changing part 1322, and the fourth direction-changing part 1323 are semicircular arc-shaped. The first sub-sections 1311 and the second sub-sections 1321 are straight lines, but are not limited thereto. The first sub-sections 1311 and the second sub-sections 1321 may also be individual curved lines with amplitudes. For example, the first sub-sections 1311 and the second sub-sections 1321 may be wavy lines, pulse lines, or square wavy lines.

When the first sub-sections 1311 and the second sub-sections 1321 are curved lines with amplitudes, bendability of the bending section 13 may be further improved.

In the supporting plate 100 of the present embodiment, the first direction-changing part 1312 is connected to the third direction-changing part 1322 by an arc, and the second direction-changing part 1313 is connected to the fourth direction-changing part 1323 by an arc. This type of arrangement prevents applied forces from being overly accumulated in the first connecting part 133 and the second connecting part 134.

Furthermore, when the supporting plate 100 is bent, deformation occurs on each of the s-shaped structures under bending forces. By accumulating deformation amount in each of the sub-structures, deformations may be uniform. Deformation is relatively small for the s-shaped structures when the s-shaped structures are bent. Applied forces endured by a certain area will not exceed an allowable stress range of a material of the s-shaped structures. As a result, permanent plastic deformation will not occur on the s-shaped structures. Therefore, although the supporting plate 100 is bent many times, good bending fatigue characteristics can still be ensured, and a certain springback potential energy is also stored. When the supporting plate 100 is unfolded, the s-shaped structures spring back because bending forces and springback potential energy are released. Correspondingly, parameters of the holes are reduced. Therefore, the supporting plate 100 may have uniform follow-up actions and good deformation consistency.

Optionally, a distance between two adjacent first sub-sections 1311 and a distance between two adjacent second sub-sections 1321 may be equal. Due to the above arrangements, stability of the bending area 13 can be improved, and possibility of concentration of bending applied forces is reduced.

In the present embodiment, as shown in FIG. 3, widths of the first connecting part 133 and the second connecting part 134 are X. Widths of the first sub-part 1311 and the second sub-part 1321 are Y. A width of the holes formed from the first bending part 131 and the second bending part 132 is D. A length of the holes formed from the first bending part 131 and the second bending part 132 is L.

Specifically, in each of the bending units 13*a*, an interval between the holes 135 along a long-axis direction is the width of a first connecting part 133 and the width of a second connecting part 134. In the present embodiment, the width of a first connecting part 133 and the width of a second connecting part 134 are equal. An interval between the holes 135 along a short-axis direction is the width of the first sub-part 1311 or the width of the first sub-part 1321. In the present embodiment, the width of the first sub-part 1311 and the width of the second sub-part 1321 are equal. In addition, a radius of the arc between the first connecting part 133 and the second connecting part 134 is R, and the radius R may be determined according to actual requirements and the width X. For example, the radius R may be 0.2 mm.

By setting the above parameters in combination, bendability of the bending part 13 may be improved, and possibility of concentration of applied forces at the bending part may be reduced.

Figure 6:
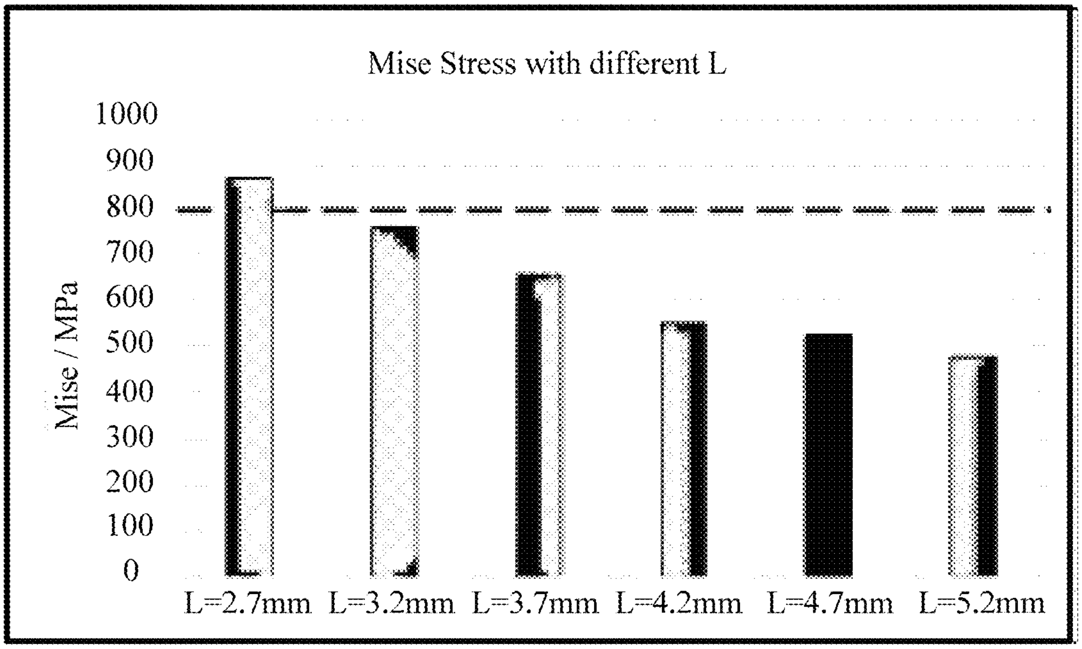
FIG. 6 is a trend chart showing a relationship between a length (L) of a hole of the bending unit of the supporting plate and an applied force endured by the bending unit.

In the present embodiment, as shown in FIG. 6, when other parameters are constant, a relationship between a length L of the holes 135 in each of the bending units 13*a* and applied forces endured by each of the bending units 13*a* is: the greater the length L, the less the applied forces endured by each of the bending units 13*a*.

Figure 7:
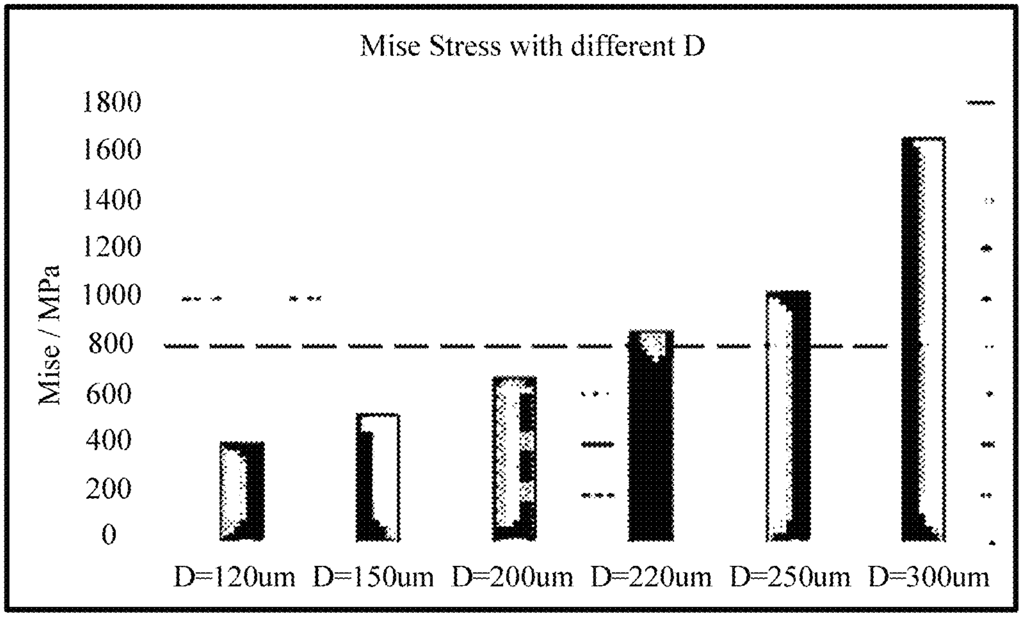
FIG. 7 is a trend chart showing a relationship between a width (D) of the hole of the bending unit of the supporting plate and the applied force endured by the bending unit.

As shown in FIG. 7, when other parameters are constant, a relationship between a width D of the holes 135 in each of the bending units 13*a* and applied forces endured by each of the bending units 13*a* is: the greater the width D, the greater the applied forces endured by each of the bending units 13*a*.

Figure 8:
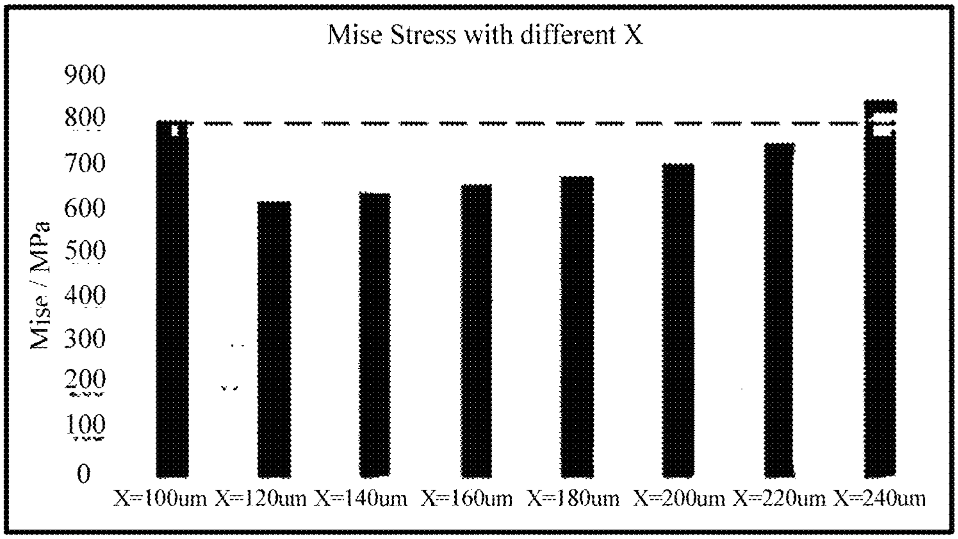
FIG. 8 is a trend chart showing a relationship between an interval (X), which is a connection part, between the holes of the bending unit of the supporting plate along a long-axis direction and the applied force endured by the bending unit.

As shown in FIG. 8, when other parameters are constant, a relationship between the intervals X (connecting part) between the holes 135 in each of the bending units 13*a* along the long-axis direction and applied forces endured by each of the bending units 13*a* is: when the intervals X are within a range from 120 μm to 240 μm, the greater the intervals X, the greater the applied forces endured by each of the bending units 13*a*.

Figure 9:
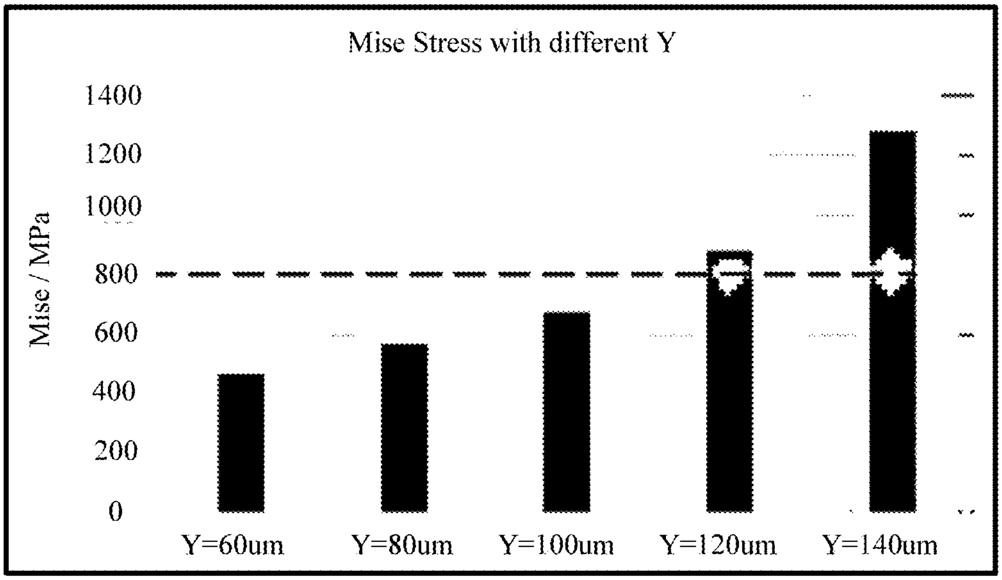
FIG. 9 is a trend chart showing a relationship between an interval (Y), which is a width of a first sub-section, between the holes of the bending unit of the supporting plate along a short-axis direction and the applied force endured by the bending unit.

As shown in FIG. 9, when other parameters are constant, a relationship between the intervals Y (widths of the first sub-parts) of the holes 135 in the bending units 13*a* along the short-axis direction and applied forces endured by each of the bending units 13*a* is: the greater the intervals Y, the greater the applied forces endured by each of the bending units 13*a*.

In addition, in the bending units 13*a* as shown in FIGS. 6 to 9, when applied forces endured by the bending units 13*a* reach 800 MPa, failure occurs on the bending units 13*a*. To reduce possibility of failure occurring on the bending units 13*a* when the bending units 13*a* are bent, applied forces endured by the bending units 13*a* should be reduced below 800 MPa.

Below are ranges of the parameters: 100 μm≤X≤220 μm, Y≤120 μm, D≤ 200 μm, and L≤3.2 mm. By applying the above ranges, possibility of failure of the bending units is reduced.

Of course, failure of the bending units 13*a* is also relevant to a material of the supporting plate 100. Different materials may have different allowable stress ranges.

In the present embodiment, the material of the supporting plate 100 is a special metal with strong strength and good anti-fatigue capabilities when being bent. The material of the supporting plate 100 mainly includes, but is not limited to, alloy steels such as low carbon steel, titanium alloy, or magnesium alloy.

Figure 10:
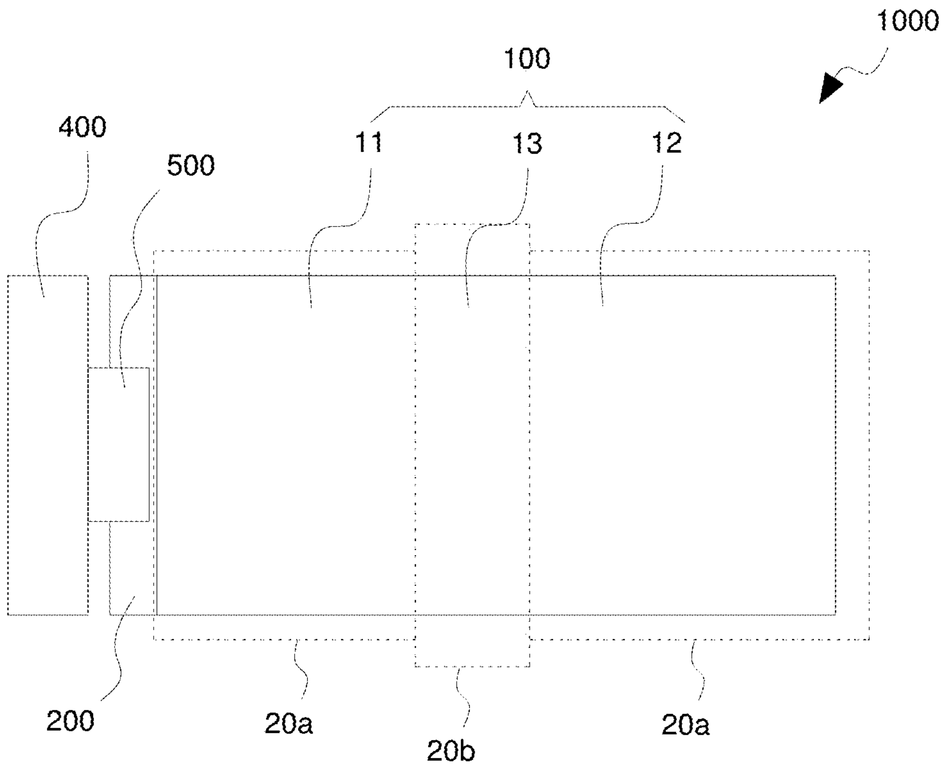
FIG. 10 is structural schematic top view showing an unfolded display module according to an embodiment of the present disclosure.
Figure 11:
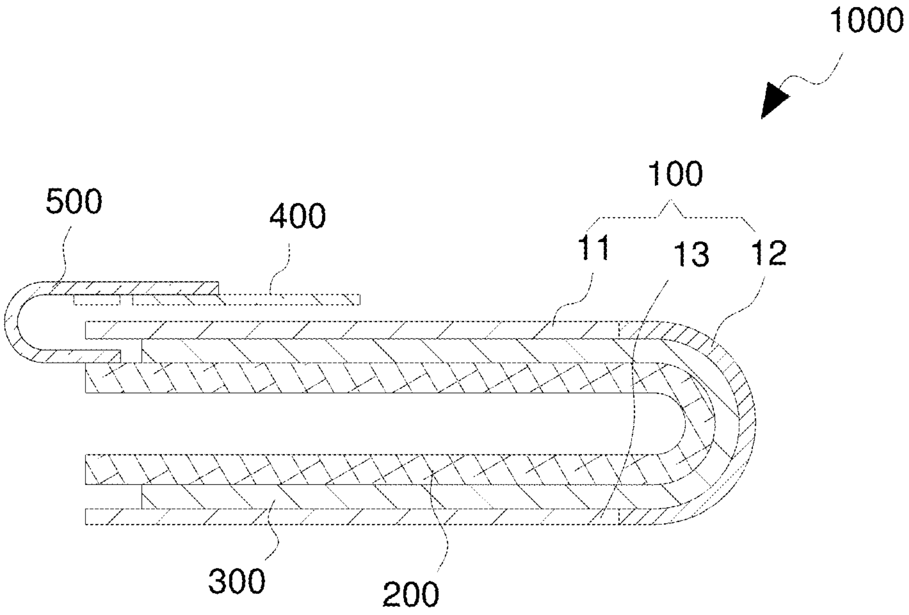
FIG. 11 is a sectional schematic view showing a folded display module according to the embodiment of the present disclosure.

Please refer to FIG. 10 and FIG. 11, the present disclosure further relates to a display module 1000, including an organic light-emitting display (OLED) panel 200, an adhesive layer 300, and the above-mentioned supporting plate 100, which are sequentially disposed. The display module 1000 further includes a driver 400 and a flexible circuit board 500. The driver 400 is disposed on the flexible circuit board 500. The flexible circuit board 500 is electrically connected to the OLED panel 200.

The OLED panel 200 includes a bending area 20*a* and a non-bending area 20*b* disposed at two sides of the bending area 20*a*. The first supporting main body 11 and the second supporting main body 12 are respectively and correspondingly disposed in the non-bending area 20*b*. The bending part 13 is correspondingly disposed in the bending area 20*b*.

When the display module 1000 is bent, deformation occurs on each s-shaped structure. By accumulating deformation amount in each sub-structure, deformations may be uniform. Deformation of the s-shaped structures is relatively small when the s-shaped structures are bent. Therefore, applied forces endured by a certain area will not exceed an allowable stress range of a material of the s-shaped structures. As a result, permanent plastic deformation will not occur on the s-shaped structures. Thus, although the supporting plate 100 is bent many times, good bending fatigue characteristics can still be ensured, and a certain springback potential energy is also stored. When the supporting module 1000 is unfolded, the s-shaped structures spring back because bending forces and springback potential energy are released. Correspondingly, parameters of the holes are reduced. Therefore, the supporting module 1000 may have uniform follow-up actions and good deformation consistency.

In the supporting plate and the display module of the present disclosure, by configuring the first bending part in the bending area of the supporting plate as multiple bending structures that bend back and forth in two opposite directions, deformations may accumulate in the first bending part. Therefore, a deformation difference between a SUS and an OCA may be compensated, and applied forces may be prevented from accumulating in a certain area. As a result, risks of failure during a bending process of the display module are effectively reduced.

The supporting plate and the display module provided by the above embodiments of the present disclosure have been described in detail, which illustrates principles and implementations thereof. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A supporting plate, comprising a first supporting main body, a second supporting main body, and a bending part, wherein the bending part is connected between the first supporting main body and the second supporting main body;

wherein the bending part comprises at least one bending unit comprising a first bending part, an end of the first bending part is connected to the first supporting main body, and another end of the first bending part is connected to the second supporting part;

wherein the bending unit further comprises a second bending part, an end of the second bending part is connected to the first supporting main body, and another end of the second bending part is connected to the second supporting main body;

wherein the second bending part and the first bending part comprise a plurality of first connecting parts spaced apart from each other, and an extending track of the first bending part and an extending track of the second bending part are separated from each other and are reconnected to each other at each of the first connecting parts.

2. The supporting plate of claim 1, wherein along a direction from the first supporting main body to the second supporting main body, the first bending part comprises a plurality of bending structures that bend back and forth in two opposite directions, wherein along the direction from the first supporting main body to the second supporting main body, the second bending part comprises a plurality of bending structures that bend back and forth in two opposite directions.

3. The supporting plate of claim 1, wherein the plurality of bending units are sequentially connected to each other side by side along a direction perpendicular to the direction from the first supporting main body to the second supporting main body;

between two adjacent bending units, the second bending part of one bending unit and the first bending part of the other bending unit comprise the plurality of second connecting parts spaced apart from each other; and between two adjacent bending units, an extending track of the second bending part of one bending unit and an extending track of the first bending part of the other bending unit are separated from each other and are reconnected to each other at each of the second connecting parts.

4. The supporting plate of claim 3, wherein the first bending part comprises:

a plurality of first sub-sections spaced apart from each other and disposed side by side;

at least one first direction-changing part connected to a same side of a kth first sub-section and a (k+1)th first sub-section; and at least one second direction-changing part, wherein a bending direction of the at least one second direction-changing part and a bending direction of the at least one first direction-bending part are opposite, the at least one second direction-changing part is connected to another same side of the (k+1)th first sub-section and a (k+2)th first sub-section, and k is an even number or an odd number.

5. The supporting plate of claim 4, wherein the second bending part comprises:

a plurality of second sub-sections spaced apart from each other and disposed side by side;

at least one third direction-changing part, and a bending direction of third direction-changing part and the bending direction of the at least one first direction-bending part are opposite, and the at least one third direction-changing part is connected to a same side of a kth second sub-section and a (k+1)th second sub-section; and at least one fourth direction-changing part, wherein a bending direction of the at least one fourth direction-changing part and a bending direction of the at least one third direction-bending part are opposite, and the at least one fourth direction-changing part is connected to another same sides of the (k+1)th second sub-section and a (k+2)th second sub-section; and the at least one third direction-changing part and the at least one first direction-changing part are connected to each other to form the first connecting part.

6. The supporting plate of claim 5, wherein between two adjacent bending units, the at least one fourth direction-changing part and the at least one second direction-changing part are connected to each other to form the second connecting part.

7. The supporting plate of claim 4, wherein the at least one first direction-changing part comprises an arc shape or a polyline shape formed by two line sections.

8. The supporting plate of claim 5, wherein the at least one first direction-changing part is connected to the at least one third direction-changing part by an arc.

9. The supporting plate of claim 8, wherein a distance between two adjacent first sub-sections and a distance between two adjacent second sub-sections are equal.

10. The supporting plate of claim 9, wherein the at least one first direction-changing part and the at least one third direction-changing part are semicircular arc-shaped, a width of the first connecting part is X, widths of the first sub-sections and the second sub-sections are Y, a width of a hole formed from the at least one first bending part and the at least one second bending part is D, and a length of the hole formed from the at least one first bending part and the at least one second bending part is L; and wherein 100 μm≤X≤220 μm, Y≤120 μm, D≤200 μm, and L≤3.2 mm.

11. A display module, comprising an organic light-emitting diode (OLED) panel, an adhesive layer, and a supporting plate, which are sequentially disposed;

wherein the OLED panel comprises a bending area and a non-bending area disposed at two sides of the bending area; the supporting plate comprises a first supporting main body, a second supporting main body, and a bending part; the bending part is connected between the first supporting main body and the second supporting main body; the first supporting main body and the second supporting main body are respectively and correspondingly disposed in the non-bending area; and the bending part is correspondingly disposed in the bending area;

wherein the bending part comprises at least one bending unit comprising a first bending part, an end of the first bending part is connected to the first supporting main body, and another end of the first bending part is connected to the second supporting part;

wherein the bending unit further comprises a second bending part, an end of the second bending part is connected to the first supporting main body, and another end of the second bending part is connected to the second supporting main body;

wherein the second bending part and the first bending part comprise a plurality of first connecting parts spaced apart from each other, and an extending track of the first bending part and an extending track of the second bending part are separated from each other and are reconnected to each other at each of the first connecting parts.

12. The display module of claim 11, wherein along a direction from the first supporting main body to the second supporting main body, the first bending part comprises a plurality of bending structures that bend back and forth in two opposite directions, wherein along the direction from the first supporting main body to the second supporting main body, the second bending part comprises a plurality of bending structures that bend back and forth in two opposite directions.

13. The display module of claim 11, wherein the plurality of bending units are sequentially connected to each other and disposed side by side along a direction perpendicular to the direction from the first supporting main body to the second supporting main body;

between two adjacent bending units, the second bending part of one bending unit and the first bending part of the other bending unit comprise the plurality of second connecting parts spaced apart from each other; and between two adjacent bending units, the extending track of the second bending part of one bending unit and the extending track of the first bending part of the other bending unit are separated from each other and are reconnected to each other at each of the second connecting parts.

14. The display module of claim 13, wherein the first bending part comprises:

a plurality of first sub-sections spaced apart from each other and disposed side by side;

at least one first direction-changing part connected to a same side of a kth first sub-section and a (k+1)th first sub-section; and at least one second direction-changing part, wherein a bending direction of the at least one second direction-changing part and a bending direction of the at least one first direction-bending part are opposite, the at least one second direction-changing part is connected to another same side of the (k+1)th first sub-section and a (k+2)th first sub-section, and k is an even number or an odd number.

15. The display module of claim 14, wherein the second bending part comprises:

a plurality of second sub-sections spaced apart from each other and disposed side by side;

at least one third direction-changing part, wherein a bending direction of the at least one third direction-changing part and a bending direction of the at least one first direction-bending part are opposite, and the at least one third direction-changing part is connected to another same side of a kth second sub-section and a (k+1)th second sub-section; and at least one fourth direction-changing part, wherein a bending direction of the at least one fourth direction-changing part and a bending direction of the at least one third direction-bending part are opposite, and the at least one fourth direction-changing part is connected to a same side of the (k+1)th second sub-section and a (k+2)th second sub-section;

wherein the at least one third direction-changing part and the at least one first direction-changing part are connected to each other to form the first connecting part.

16. The display module of claim 15, wherein between two adjacent bending units, the at least one fourth direction-changing part and the at least one second direction-changing part are connected to each other to form the second connecting part.

17. The display module of claim 14, wherein the at least one first direction-changing part comprises an arc shape or a polyline shape formed from two line sections.

18. The display module of claim 15, wherein the at least one first direction-changing part is connected to the at least one third direction-changing part by an arc.

19. The display module of claim 18, wherein a distance between two adjacent first sub-sections and a distance between two adjacent second sub-sections are equal.

20. The display module of claim 19, wherein the at least one first direction-changing part and the at least one third direction-changing part are semicircular arcs, a width of the first connecting part is X, widths of the first sub-sections and the second sub-sections are Y, a width of a hole formed from the at least one first bending part and the at least one second bending part is D, and a length of the hole formed by the at least one first bending part and the at least one second bending part is L; and wherein 100 μm≤X≤220 μm, Y≤120 μm, D≤200 μm, and L≤3.2 mm.

* * * * *